(12) United States Patent
Kasper et al.

(10) Patent No.: US 10,173,654 B2
(45) Date of Patent: Jan. 8, 2019

(54) ELECTRONICALLY SLIP-CONTROLLABLE VEHICLE BRAKE SYSTEM

(71) Applicant: Robert Bosch GmbH, Stuttgart (DE)

(72) Inventors: Christoph Kasper, Charleston, SC (US); Guenther Schnalzger, Blaichach (DE); Juergen Reiner, Gestratz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/318,508

(22) PCT Filed: May 6, 2015

(86) PCT No.: PCT/EP2015/059906
§ 371 (c)(1),
(2) Date: Dec. 13, 2016

(87) PCT Pub. No.: WO2015/193027
PCT Pub. Date: Dec. 23, 2015

(65) Prior Publication Data
US 2017/0137007 A1 May 18, 2017

(30) Foreign Application Priority Data
Jun. 17, 2014 (DE) .......................... 10 2014 211 582

(51) Int. Cl.
*B60T 8/44* (2006.01)
*B60T 8/48* (2006.01)
(Continued)

(52) U.S. Cl.
CPC ............ *B60T 8/442* (2013.01); *B60T 8/4872* (2013.01); *B60T 13/147* (2013.01); *B60T 13/662* (2013.01); *B60T 13/686* (2013.01)

(58) Field of Classification Search
CPC ...... B60T 8/442; B60T 13/686; B60T 13/662; B60T 13/147; B60T 8/4872
(Continued)

(56) References Cited

U.S. PATENT DOCUMENTS 4,844,558 A * 7/1989 Ishii ...................... B60T 8/3615
303/116.1
4,865,397 A 9/1989 Inoue et al.
(Continued)

FOREIGN PATENT DOCUMENTS

DE 38 31 426 A1 4/1989
DE 38 32 023 A1 3/1990
(Continued)

OTHER PUBLICATIONS

International Search Report corresponding to PCT Application No. PCT/EP2015/059906, dated Aug. 4, 2015 (German and English language document) (7 pages).

*Primary Examiner* — Pamela Rodriguez
(74) *Attorney, Agent, or Firm* — Maginot, Moore & Beck LLP

(57) ABSTRACT

An electronically slip-controllable vehicle brake system includes a human-powered master brake cylinder, a pressure generator, an electronically actuatable valve device, a wheel brake, and an electronically actuatable actuator. The wheel brake is connected to the master cylinder and the pressure generator. The pressure generator is drivable via an external force and is configured to supply pressurized brake fluid to the wheel brake. The valve device is configured to control pressure medium connections from the master brake cylinder to the wheel brake and to a suction side of the pressure generator, and includes three pressure medium connections. The actuator is configured to switch the valve device between three different positions whereat the pressure
(Continued)

medium connections are connected to or block from each other in different combinations.

12 Claims, 1 Drawing Sheet

(51) Int. Cl.
 *B60T 13/14* (2006.01)
 *B60T 13/66* (2006.01)
 *B60T 13/68* (2006.01)
(58) Field of Classification Search
 USPC ... 303/10, 116.1, 116.2, 116.3, 116.4, 119.3; 137/891, 892, 861–864, 625.18
 See application file for complete search history.

(56) References Cited

U.S. PATENT DOCUMENTS

| | | | |
|---|---|---|---|
| 5,061,017 A | | 10/1991 | Kirstein |
| 5,221,129 A | * | 6/1993 | Takasaki ............... B60T 8/5037 303/117.1 |
| 5,628,550 A | * | 5/1997 | Zaviska ................ B60T 8/341 137/522 |
| 6,050,654 A | * | 4/2000 | Gegalski ................ B60T 8/326 251/129.02 |
| 6,508,521 B2 | * | 1/2003 | Gegalski ................ B60T 8/363 303/139 |
| 6,648,423 B1 | * | 11/2003 | Klein ....................... B60T 7/12 180/170 |
| 2009/0306871 A1 | | 12/2009 | Alford et al. |

FOREIGN PATENT DOCUMENTS

| | | |
|---|---|---|
| DE | 199 40 263 A1 | 3/2001 |
| DE | 10 2013 226 401 A1 | 6/2015 |
| GB | 2 224 089 A | 4/1990 |
| JP | 61-54351 A | 3/1986 |
| JP | 64-47649 A | 2/1989 |
| JP | 2-231256 A | 9/1990 |
| JP | 3-200461 A | 9/1991 |
| JP | 4-224452 A | 8/1992 |
| JP | 2003-507258 A | 2/2003 |
| WO | 96/36518 A1 | 11/1996 |
| WO | 2006/131369 A1 | 12/2006 |

* cited by examiner

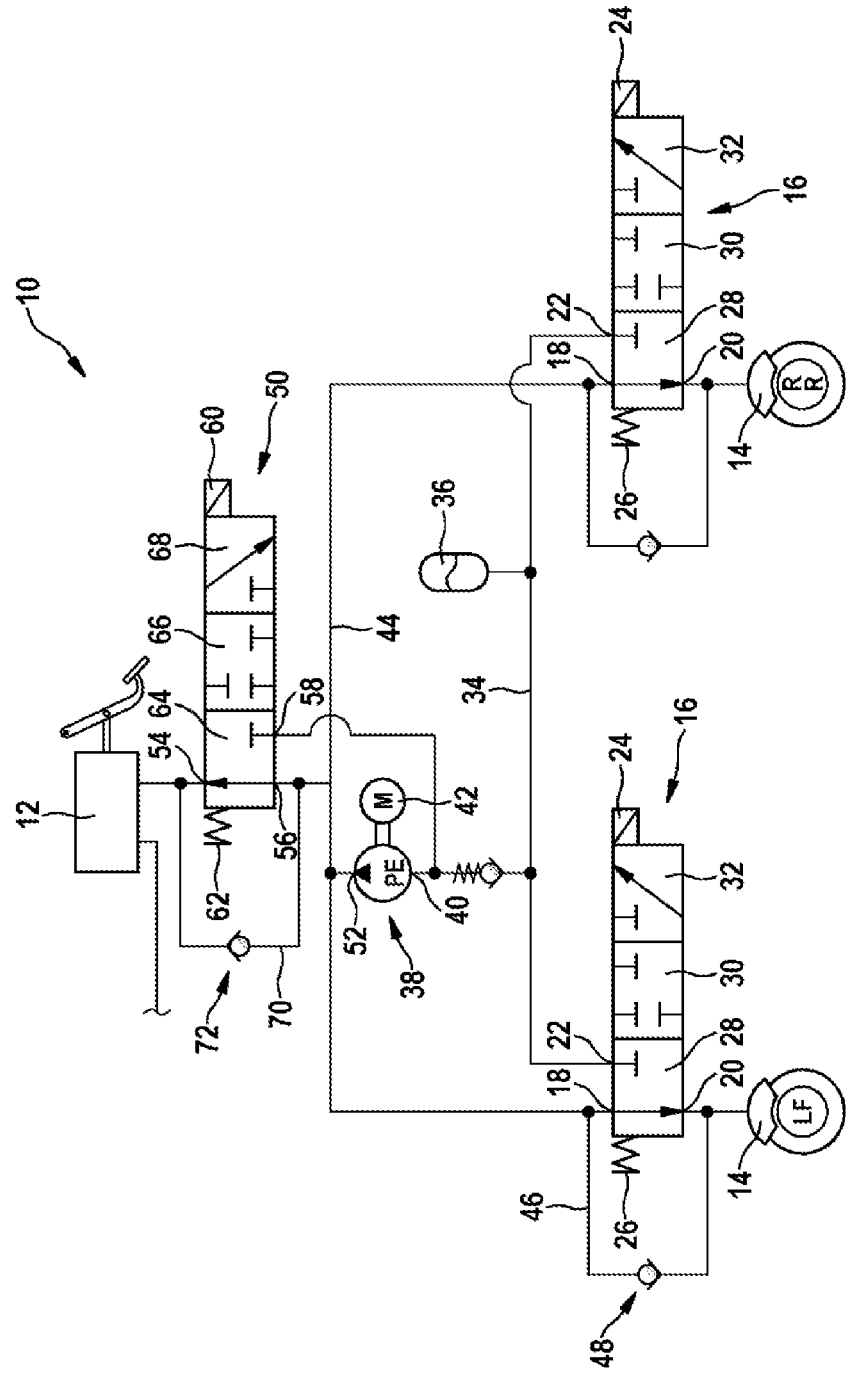

ELECTRONICALLY SLIP-CONTROLLABLE VEHICLE BRAKE SYSTEM

This application is a 35 U.S.C. § 371 National Stage Application of PCT/EP2015/059906, filed on May 6, 2015, which claims the benefit of priority to Serial No. DE 10 2014 211 582.5, filed on Jun. 17, 2014 in Germany, the disclosures of which are incorporated herein by reference in their entirety.

BACKGROUND

The disclosure relates to an electronically slip-controllable vehicle brake system. A slip-controllable vehicle brake system of this kind is known from DE 199 40 263 A1, for example. This known vehicle brake system comprises an antilock control system, a traction control system and an electronic stability control system. Whereas, in the case of an antilock control operation, the driver produces the brake pressure in a wheel brake by actuating a brake master cylinder by muscle power, this brake pressure is produced at least partially by external force in the case of a traction control operation and a stability control operation. For this purpose, the vehicle brake system is provided with a pressure generator, which is driven by an electronically actuable electric motor.

Between the brake master cylinder and the wheel brake of the known vehicle brake system, there is a first pressure medium connection that can be controlled by a changeover valve. In its normal position, the changeover valve is an open directional control valve having two pressure medium ports, which can be switched over from the through flow position into a shutoff position. In the shutoff position of the changeover valve, the hydraulic connection between the driver and the wheel brake is interrupted, and therefore the brake pressure can no longer be changed by the driver.

There is a second pressure medium connection between the brake master cylinder and a suction side of the pressure generator. This pressure medium connection can be controlled by means of an "intake" valve. This intake valve is a directional control valve that is closed in its normal position and has two pressure medium ports, which valve can be switched over from a shutoff position into a through flow position in order to enable the pressure generator to be supplied with pressure medium from the brake master cylinder when required.

The intake valve and the changeover valve are designed as two 2/2-way valves which are structurally separate from one another and can each be switched over by an associated electronically actuable actuator. This mode of construction is relatively complex, requires duplicated assembly work for anchoring the two valves on a housing block of a hydraulic unit of the vehicle brake system, takes up a relatively large amount of installation space in this housing block and is furthermore expensive.

The description of DE 199 40 263 A1 contains the indication that it is also possible to use a common 3/3-way valve instead of two individual 2/2-way valves. However, this indication relates to the pressure buildup and pressure reduction valves, i.e. to the device for modulating the brake pressure in the wheel brake, and not to a combination of a changeover valve with an intake valve in a vehicle brake system with electronic stability control (ESP brake system).

SUMMARY

An electronically slip-controllable vehicle brake system according to this disclosure has the advantage that there is a reduction in the number of subassemblies required owing to the use of component synergies and, ultimately, it is possible to save on component and assembly costs and on installation space.

Further advantages or advantageous developments of the disclosure will become apparent from the claims and from the following description.

BRIEF DESCRIPTION OF THE DRAWINGS

An illustrative embodiment of the disclosure is shown in the drawing and explained in detail in the following description. The single FIGURE shows a brake circuit of an electronically slip-controllable vehicle brake system constructed in accordance with the disclosure, having electronic stability control, by means of a hydraulic circuit diagram containing the graphical symbols for the significant components.

DETAILED DESCRIPTION

The FIGURE shows a brake circuit 10 of a vehicle brake system provided with antilock, traction control and stability control (ABS/ESP brake system). This brake circuit 10 is connected to a brake master cylinder 12, which can be actuated by muscle power by a driver, e.g. via a brake pedal, in order to supply brake fluid under pressure to two wheel brakes 14 of the brake circuit 10. The brake pressure in the wheel brakes 14 is in each case set with the aid of a pressure modulation valve 16 and matched to the slip conditions prevailing at the wheel associated with the respective wheel brake 14. The respective pressure modulation valve 16 is designed as a directional control valve with three pressure medium ports 18, 20, 22, which can be switched into three discrete positions 28, 30, 32, counter to the force of a return element 26, by an electronically actuable actuator 24.

In the normal position 28 shown, the pressure modulation valve 16 is open (through flow position), i.e. a brake master cylinder or inlet port 18 and a wheel port 20 of the pressure modulation valve 16 are connected to one another, allowing brake fluid to flow into the associated wheel brake 14. The hydraulic connection which exists allows flow in both flow directions for situation-dependent adaptation of the brake pressure. A return port 22 of the pressure modulation valve 16 is shut off in this normal position 28, this being a precondition for pressure buildup in the wheel brake 14.

In a central position of the pressure modulation valve, all three ports 18, 20, 22 are shut off from one another. This shutoff position 30 serves to maintain the brake pressure, once it has built up.

In a third position of the pressure medium modulation valve 16, the wheel port 20 and a return port 22 are connected to one another, and the brake master cylinder port 18 is shut off. In this pressure reduction position 32, brake fluid flows out of the wheel brake 14, causing a reduction in the brake pressure.

Outflowing brake fluid passes into a return 34, which is connected to the return port 32 of the pressure modulation valve 16 of the other wheel brake 14 of the brake circuit 10. In the return 34 there is a pressure accumulator 36, which initially buffers the outflowing brake fluid. A pressure generator 38 is furthermore connected by its pump suction port 40 to the return 34. The pressure generator 38 can be actuated by an electronically actuable drive motor 42 in order to pump brake fluid back to the brake master cylinder port 18, which is closed in the pressure reduction position 32 of the pressure modulation valve 16, while simultaneously increasing the brake pressure. Similarly to the return ports 22, the brake master cylinder ports of the pressure modulation valve 16 of a brake circuit 10 are also coupled to one another by an inlet line 44.

Each pressure modulation valve 16 can be bypassed by a bypass 46 having a check valve 48 arranged therein, wherein this check valve 48 opens in the direction from the wheel brake 14 to the brake master cylinder 12 and closes in the opposite direction. The bypass 46 and the check valve 48 are provided in order to allow more rapid and, as far as possible, unthrottled reduction of brake pressure at the wheel brake 14 as soon as the driver reduces the actuating force on the brake master cylinder 12 and, consequently, the pressure level at the brake master cylinder port 18 is lower than at the wheel brake port 20 of the pressure modulation valve 16.

The brake circuit 10 is furthermore provided with a mode changeover valve 50, which is arranged between the brake master cylinder 12 and a pump pressure port 52 of the pressure generator 40. According to the disclosure, this mode changeover valve 50 is embodied in the form of a directional control valve having three pressure medium ports 54, 56, 58, which can be switched into three discrete positions 64, 66, 68, counter to the force of a return element 62, by an electronically actuable actuator 60. The three pressure medium ports are a brake master cylinder port 54, a pump pressure port 56 and a pump suction port 58. In the illustrated normal position 64 of the mode changeover valve 50, there is a pressure medium connection allowing flow in both flow directions between the brake master cylinder port 54 and the pump pressure port 56, through which connection brake fluid flows from the brake master cylinder 12 to the pressure side of the pressure generator 38 and to the inlet port 18 of the pressure modulation valve 16, respectively. During this process, the pump suction port 58 of the mode changeover valve 50 is shut off, thus allowing the pressure generator 38 to at least draw in pressure medium from the return 34.

In a central or second position of the mode changeover valve 50, all three ports are shut off from one another, and this position is therefore also referred to as shutoff position 66.

In a third position of the mode changeover valve 50, in contrast, the brake master cylinder port 54 is connected to the pump suction port 58, while the pump pressure port 56 is shut off. In this intake position 68, brake fluid accordingly flows from the brake master cylinder 12 to the pump suction port 40, and therefore the pressure generator 38 is supplied with brake fluid both by the brake master cylinder 12 and by the return 34.

An optionally provided bypass 70 for the mode changeover valve 50 connects the brake master cylinder port 54 to the pump pressure port 56. This bypass 70 can be controlled by a check valve 72, which opens the flow direction from the brake master cylinder port 54 to the pump pressure port 56 and shuts off the opposite direction. By way of example, the check valve 72 is embodied without a spring, as a result of which the valve closing member thereof is pressed against a valve seat exclusively by the effective hydraulic pressure so as to close said valve seat.

Functionally, this bypass 70 can be provided if the mode changeover valve 50 would excessively restrict the pressure medium flow from the brake master cylinder 12 to the wheel brakes 14 owing to its compact dimensions and hence would hinder a muscle-powered brake pressure buildup at the wheel brakes 14 of the brake circuit 10.

Thus, the brake circuit 10 according to the disclosure has 3/3-way switching valves controlled exclusively by electronically actuable actuators 24; 60 for controlling the pressure medium flow and for adapting the brake pressure to the slip conditions at the wheels associated with the wheel brakes 14. Consequently, it consists of fewer individual valves or subassemblies than a brake circuit conventionally equipped with 2/2-way valves, and requires correspondingly fewer working steps for mounting thereof on the hydraulic unit and allows a particularly compact, i.e. space-saving, embodiment of said hydraulic unit.

The mode changeover valve 50 and the pressure modulation valves 16 are of structurally different designs since they differ from one another, in particular, in their respective third positions 32; 68, in which they connect or shut off different hydraulic ports to and from one another. Moreover, they have differently dimensioned valve seats and closing bodies owing to the pressure conditions which are established and, in view of this fact, require actuators of different powers to actuate them. In the associated bypass 46; 70 too, the mode changeover valve 50 differs from the pressure modulation valve 16, this being apparent from the check valves 48; 72, which shut off in different directions.

It is conceivable to combine the bypass 70 having check valve 72 and the mode changeover valve 50 to form a structural unit or, alternatively, to form bypass 70 and check valve 72 separately from the mode changeover valve 50.

The operation of the brake circuit 10 described is known in principle and would therefore only be outlined briefly below for the sake of understanding:

In antilock mode, the brake pressure is produced by the driver by muscle-powered actuation of the brake master cylinder 12. In this case, the brake mode changeover valve 50 assumes its normal position 64, as do the pressure modulation valves 16 associated with the various wheel brakes 14 of the brake circuit 10. Consequently, there is a continuous pressure medium connection from the brake master cylinder 12 to the wheel brakes 14, via which a brake pressure buildup takes place. Once the necessary brake pressure is reached, the pressure modulation valves 16 are switched into the shutoff position 30 thereof (central position), and the brake pressure is held. Any reduction in the brake pressure which may be required is accomplished by switching the pressure modulation valves 16 into the third position 32 thereof, in which the wheel brakes 14 are connected to the return 34 and the inlet 18 is interrupted. During this process, brake fluid flows from the wheel brakes 14 into the return 34 and back to the pump suction port 40. The pressure generator 38 driven by an external force pumps the available brake fluid back to the brake master cylinder 12 through the mode changeover valve 50. There is no flow through the bypass 70 of the mode changeover valve 50 because the check valve 72 is pressed against its seat by the higher pressure at the pump pressure port 56 of the mode changeover valve 50 and hence shuts off this flow direction.

In the case where traction control or stability control is taking place, during which there is no actuation of the brake master cylinder 12 by the driver in a manner matched to the braking situation, the mode changeover valve 50 assumes its intake position 68 and hence connects the brake master cylinder 12 to the suction port 40 of the pressure generator 38. As the latter is driven by the drive motor 42, brake fluid is drawn in from the brake master cylinder 12 and pumped to the pressure modulation valve 16, which is open in the normal position 28 thereof, while increasing the pressure in the brake fluid. From said valve, the brake fluid flows onward into the wheel brakes 14 and brings about a brake pressure buildup there.

To hold the pressure, the pressure modulation valves 16 are switched back to the central position or shutoff position 30 thereof and, to reduce the pressure, they are switched to their respective pressure reduction positions 32, as explained above.

Of course, changes or additions to the illustrative embodiment described are conceivable without departing from the basic concept of the disclosure.

The invention claimed is:

1. An electronically slip-controllable vehicle brake system, comprising:
    a wheel brake;
    a muscle-powered brake master cylinder;
    a pressure generator having a suction port, the pressure generator being configured to supply a brake fluid under brake pressure to the wheel brake in response to an external driving force, wherein the wheel brake is connectable to the brake master cylinder and to the pressure generator, and the brake master cylinder is connectable to the wheel brake and the suction port of the pressure generator via pressure medium connections;
    a first electronically actuable valve device configured to control the pressure medium connections of the brake master cylinder, the first valve device including:
        a first 3/3-way switching valve having a first pressure medium port, a second pressure medium port, and a third pressure medium port; and
        a first electronically actuable actuator configured to switch the first valve between first, second, and third discrete positions whereat different variations of the first, second, and third pressure medium ports are interconnected or shut off from each other in each of the first, second, and third discrete positions, and in one of the first, second, and third positions, the first valve connects the brake master cylinder to the suction port.

2. The electronically slip-controllable vehicle brake system as claimed in claim 1, wherein:
    the first pressure medium port is connected to the brake master cylinder;
    the pressure generator includes a pressure port;
    the second pressure medium port is connected to the pressure port; and
    the third pressure medium port is connected to the suction port;
    in the first position, the first valve connects the brake master cylinder to the pressure port, and, in the third position, the first valve connects the brake master cylinder to the suction port.

3. The electronically slip-controllable vehicle brake system as claimed in claim 2 further comprising:
    a bypass connecting the first pressure medium port to the second pressure medium port; and
    a check valve positioned in the bypass and configured to shut off the bypass in a flow direction from the second pressure medium port to the first pressure medium port.

4. The electronically slip-controllable vehicle brake system as claimed in claim 3, wherein the check valve includes a closing body that is configured to press against a valve seat of the check valve only in response to a pressure of the brake fluid.

5. The electronically slip-controllable vehicle brake system as claimed in claim 2, further comprising:
    a second electronically actuable valve device configured to modulate a pressure in the wheel brake, the second valve device including:
        a second 3/3-way valve having a fourth pressure medium port, a fifth pressure medium port, and a sixth pressure medium port; and
        a second electronically actuable actuator that is configured to switch the second valve between a fourth position, a fifth position, and a sixth position.

6. The electronically slip-controllable vehicle brake system as claimed in claim 5, wherein each of the first and second valves has exactly three ports and each of the first and second actuators has exactly three positions.

7. The electronically slip-controllable vehicle brake system as claimed in claim 5, wherein:
    the first valve device is configured to allow flow through the first valve in the first and third positions;
    the first, second, and third pressure medium ports of the first valve are shut off from each other in the second position; and
    the second position is arranged between the first and third positions.

8. The electronically slip-controllable vehicle brake system as claimed in claim 7, wherein:
    the second valve device is configured to allow flow through the second valve in the fourth and sixth positions;
    the fourth, fifth, and sixth pressure medium ports of the second valve are shut off from each other in the fifth position; and
    the fifth position is arranged between the fourth and sixth positions.

9. The electronically slip-controllable vehicle brake system as claimed in claim 5, wherein:
    the fourth pressure medium port is connected to the first pressure medium port and the pressure port of the pressure generator;
    the fifth pressure medium port is connected to the wheel brake; and
    the sixth pressure medium port is connected to the suction port of the pressure generator.

10. The electronically slip-controllable vehicle brake system as claimed in claim 9, wherein:
    in the fourth position, the second valve device allows flow between the fourth and fifth pressure medium ports such that the first pressure medium port and the pressure port of the pressure generator are connected to the wheel brake;
    in the fifth position, the fourth, fifth, and sixth pressure medium ports of the second valve are shut off from each other; and
    in the sixth position, the second valve device allows flow between the fourth and sixth pressure medium ports such that the wheel brake is connected to the suction port of the pressure generator.

11. The electronically slip-controllable vehicle brake system as claimed in claim 1, wherein:
    the first valve device is configured to enable brake fluid to flow through the first valve in the first and third positions;
    the first, second, and third pressure medium ports of the first valve and are shut off from each other in the second position; and
    the second position is arranged between the first and third positions.

12. The electronically slip-controllable vehicle brake system as claimed in claim 1, wherein the first valve has exactly three ports and the first actuator has exactly three positions.

* * * * *